Sept. 24, 1940. L. D. SOUBIER 2,215,984
APPARATUS FOR PRODUCING HOLLOW GLASS ARTICLES
Filed Oct. 13, 1938 4 Sheets-Sheet 1

L. D. Soubier
INVENTOR.

BY Rule & Hoge
ATTORNEYS.

Sept. 24, 1940.   L. D. SOUBIER   2,215,984
APPARATUS FOR PRODUCING HOLLOW GLASS ARTICLES
Filed Oct. 13, 1938   4 Sheets-Sheet 2
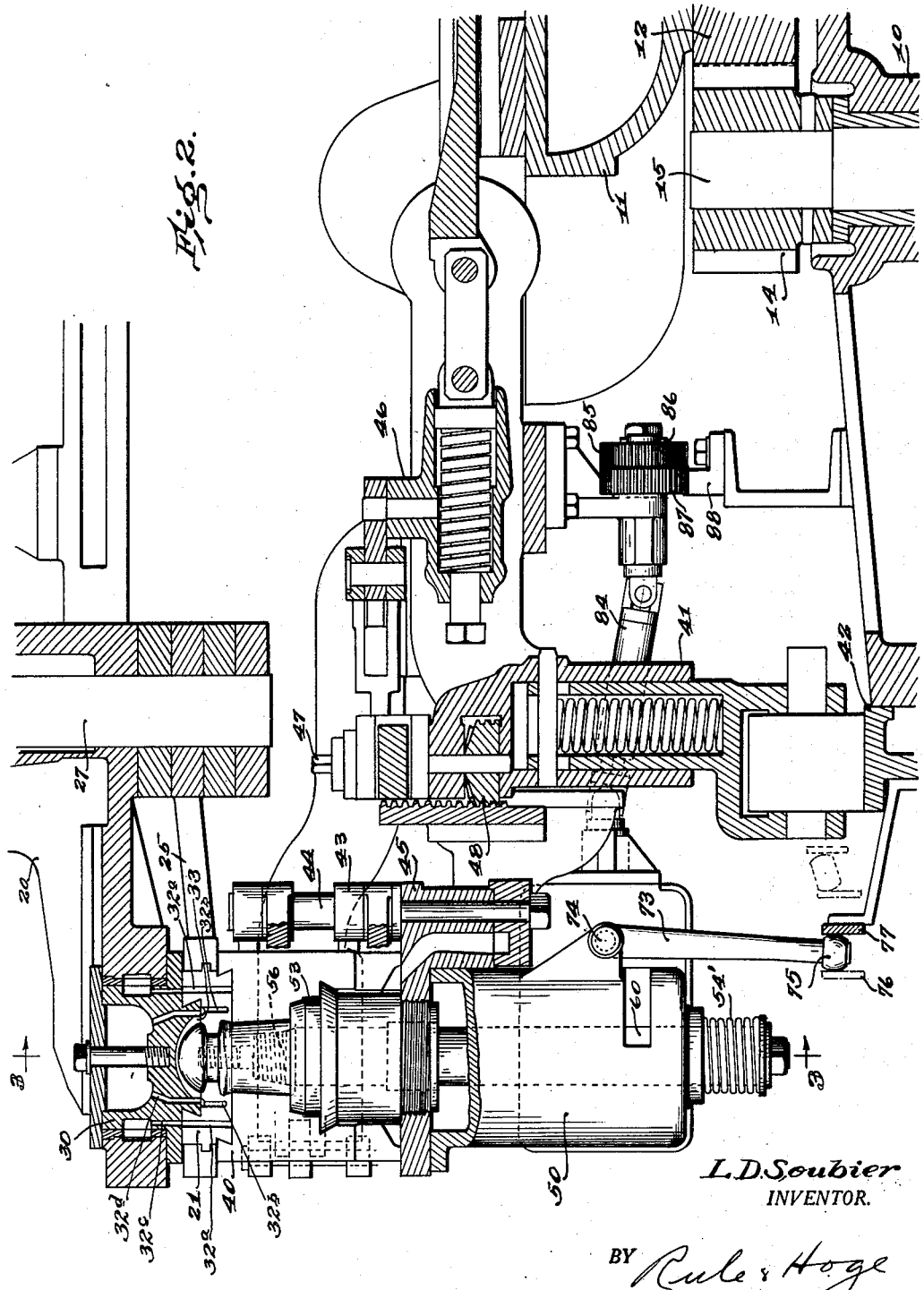
L.D. Soubier
INVENTOR.
BY Rule & Hoge
ATTORNEYS.

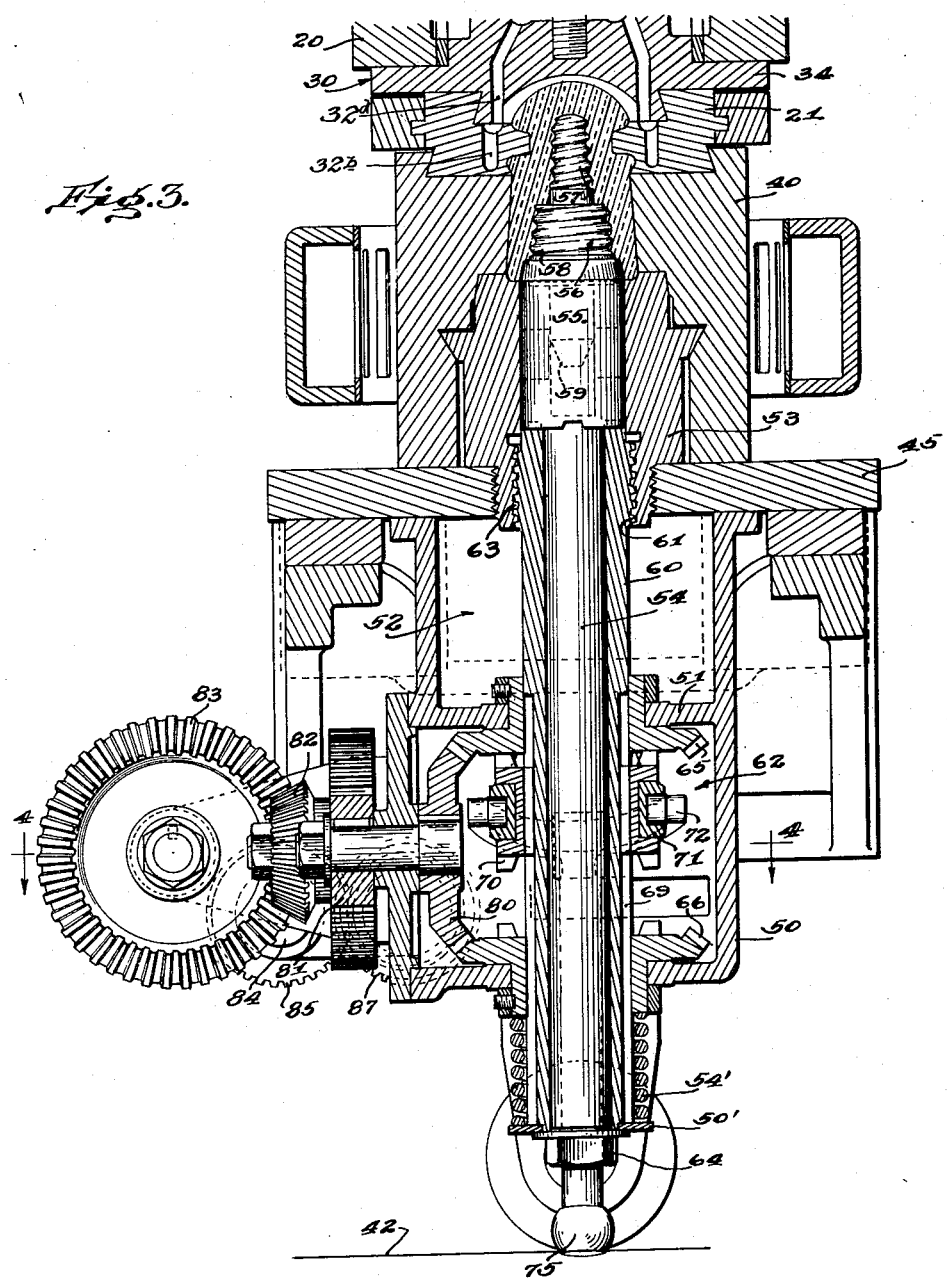

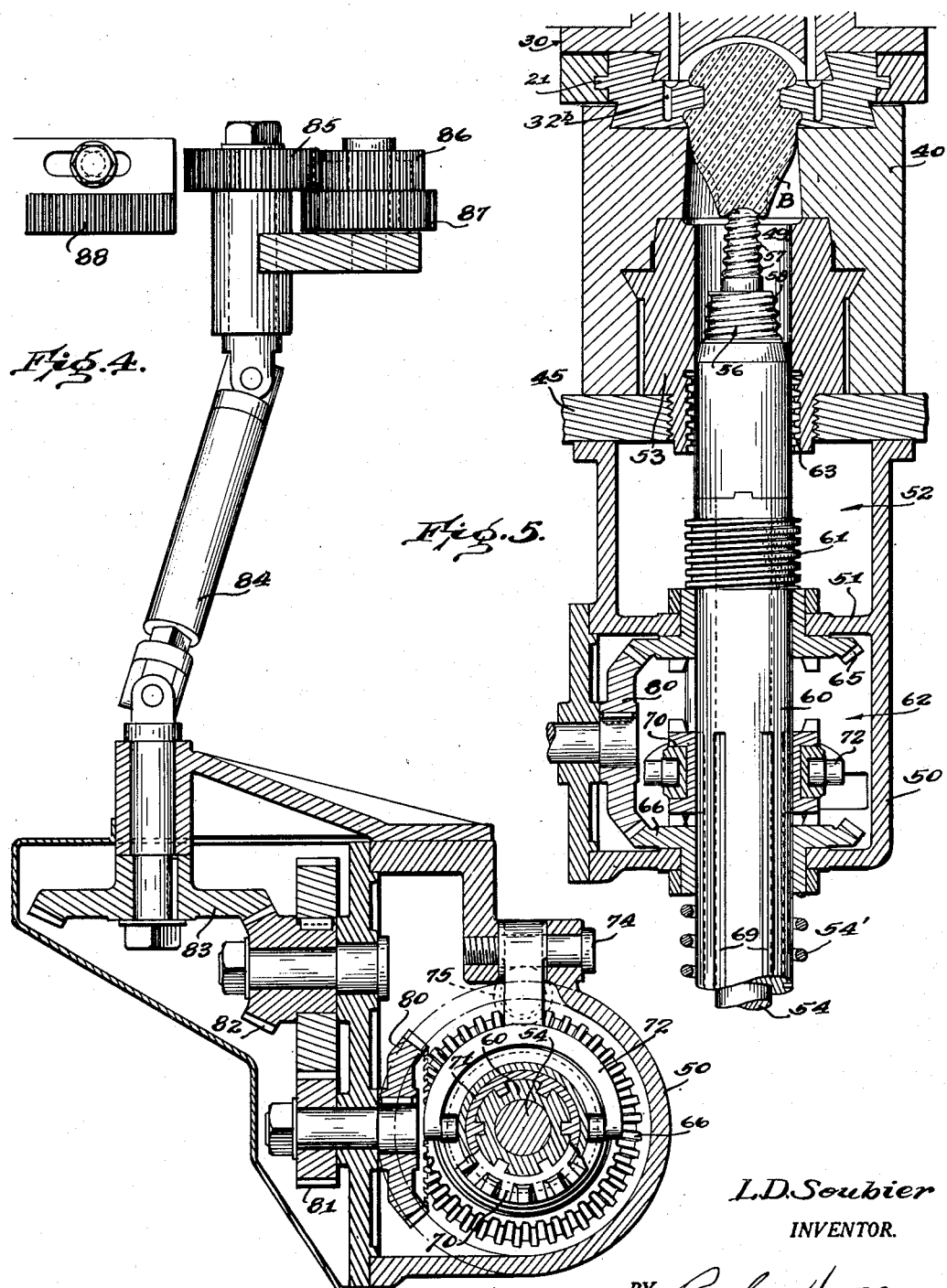

Patented Sept. 24, 1940

2,215,984

UNITED STATES PATENT OFFICE 2,215,984

APPARATUS FOR PRODUCING HOLLOW GLASS ARTICLES

Leonard D. Soubier, Toledo, Ohio, assignor to Owens-Illinois Glass Company, a corporation of Ohio Application October 13, 1938, Serial No. 234,773

12 Claims. (Cl. 49—5)

The present invention relates to apparatus for producing hollow interiorly threaded glass articles and, for illustrative purposes, is embodied in a machine designed to produce hollow interiorly threaded glass insulators.

The principal object of the invention is to provide apparatus for producing insulators by means of which the principles of the Owens suction gathering bottle forming machine shown in U. S. Letters Patent Nos. 766,768 dated August 2, 1904, 870,664 dated November 12, 1907, and 1,185,687 dated June 6, 1916, are utilized and in which charges of molten glass designed to be shaped into the form of finished insulators are gathered by suction in a series of cooperating body blank and neck molds and are later transferred by the neck molds to a series of finishing molds and are shaped therein to final form by a pressing operation utilizing a pressing mandrel.

In carrying out the above mentioned object, the invention contemplates the provision of an apparatus which is specially designed for the purpose or the use of a standard Owens type suction gathering machine which is modified to permit its use in the manufacture of the hollow glass insulators. For illustrative purposes, a modified form of a standard Owens suction gathering machine has been illustrated and in the modification thereof certain functions of the original machine have been dispensed with and others substituted in their stead.

Other objects of the invention will become apparent as the nature of the same is better understood.

In the accompanying drawings:

Fig. 2 is a sectional view similar to Fig. 1 taken at the opposite side of the forming machine, the parts being in the position they assume when the insulator is being pressed to final shape in the finishing mold;

Fig. 3 is a sectional view taken substantially along the line 3—3 of Fig. 2;

Fig. 4 is a sectional view taken substantially along the line 4—4 of Fig. 3; and Fig. 5 is a fragmentary sectional view similar to Fig. 3, the parts thereof being in the position they assume immediately after transfer of the blank to the finishing mold and prior to the pressing operation.

Figure 1:
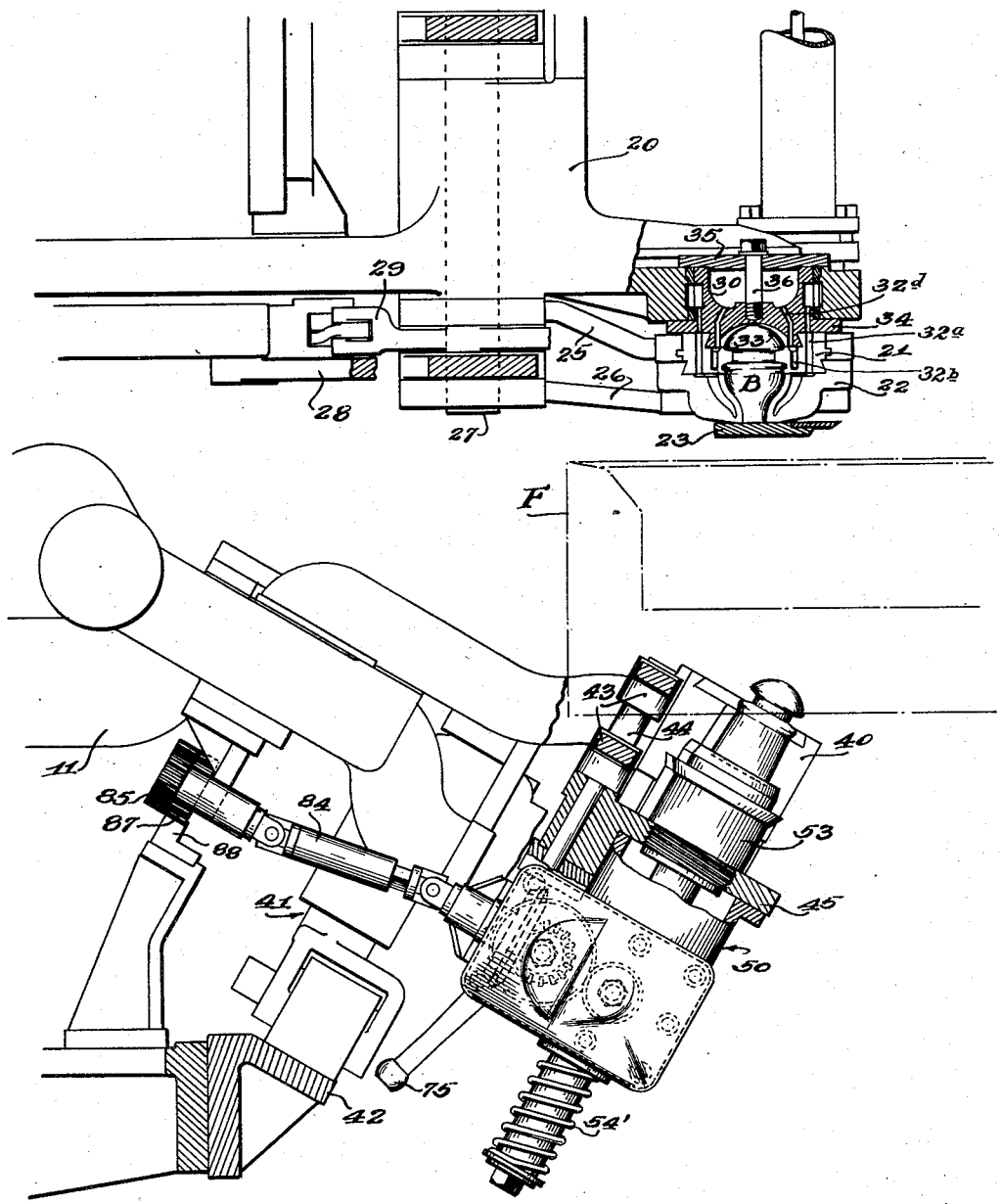
Fig. 1 is a fragmentary side elevational view, partly in section, of one head of a rotary forming machine according to the present invention, the parts being in the position they assume shortly after the suction gathering operation has taken place.

It is not deemed necessary to illustrate the entire forming machine in detail, such as the base, the driving mechanism therefor, or the various operating mechanisms for opening and closing the molds, as they form no part of the present invention. As is well known in Owens suction type machines there is a central standard or pillar around which a frame revolves, this frame carrying a series of mold heads. The number of heads employed on different machines may vary, some machines employing as few as six while others employ as many as fifteen. Since these heads on any one machine are duplicates, and since in carrying out the present invention they are modified in the same identical manner, a description of a single head is all that is deemed necessary.

A portion of one of the base sections 10 of the central pillar is shown in Fig. 2 and supported thereon for rotation about the pillar is an annulus 11 forming a part of the rotary framework of the machine. Secured to the annulus 11 beneath the same is a circular ring gear 12 with which a pinion 14 meshes. The pinion 14 is mounted upon a shaft 15, the driving mechanism for which is not shown and which causes the frame to rotate about the pillar, carrying with it the various operating instrumentalities.

In the specific embodiment of the invention there is illustrated mechanism for gathering and forming a well known type of insulator which is hollow and threaded interiorly for attachment to a threaded wooden or other supporting post when put into use. There is a frame 20 (Fig. 1) commonly referred to as the dipping frame as it carries the gathering mold to and from the molten glass contained in a forehearth F shown in dotted lines so that the mold may be filled and withdrawn when filled. The mold in which the blank B is formed comprises a neck mold 21 having vacuum passages 32ª and 32ᵇ therein and a body blank mold 22, each made in sections, and a cut-off knife 23 for severing the string of glass depending from the gathered glass in the blank. Means (not shown) is provided for raising and lowering the dipping frame 20 to move the lower end of the body blank mold into and out of contact with a pool of molten glass maintained in the forehearth F. The sectional neck mold 21 and body blank mold 22 are supported from and are arranged below the dipping frame 20 and are attached to the outer ends of arms 25 and 26 respectively which are pivoted about a common axis at the lower end of a pin 27 below the frame 20. Opening and closing of the body blank molds 22 is controlled by a mechanism, a fragment of which is shown at 28, while opening and closing of the neck molds 21 is controlled by a mechanism 29 connected to the mechanism 28 in such a manner that upon movement of the body blank mold sections to their extreme open positions, the neck molds will become open.

The arrangement of parts thus far described are purely conventional except insofar as the shape of the mold sections per se is concerned and no claim is made in this application to any novelty existing in connection with the same. The novelty resides rather in the constructions, combinations and arrangements of parts now to be more fully described.

In converting the conventional Owens type machine to use for manufacturing pressed insulators, the usual blowing mechanism is not utilized. Since there is no need for an initial blow opening in the blank B, the usual pin or core which enters the neck mold is omitted and instead an adapter 30 or head mold (Figs. 1 and 2) is mounted in the frame 20 and consists of a casting having vacuum passages 32c and 32d therein and having a dome-like cavity 33 on the underneath side thereof corresponding in curvature to the curvature of the crown portion of the insulator. The vacuum passages 32c communicate with the passages 32a of the neck mold 21 while the passages 32d communicate with the passages 32b of the neck mold. The passages 32c and 32d are connected independently to a source of vacuum. A flange 34 underlies the frame 20 while a plate 35 supported on the frame is connected to the body adapter 30 by means of a bolt 36. It will be seen that by the above arrangement of parts the adapter 30 is maintained in the frame 20 against dislodgement.

The cavity 33 provided in the adapter communicates with the cavity of the neck mold 21 when the sections of the latter are closed and these cavities together with the cavity of the body blank mold 22 cooperate to make the entire blank mold cavity. The application of vacuum to the interior of the blank mold cavity through the vacuum passages 32c, 32a and 32d, 32b is controlled by the usual vacuum valve and connections (not shown) the details of which may be ascertained by reference to any one of the above mentioned patents. It is deemed sufficient to state that when the adapter 30 and neck and body blank molds 21 and 22 are brought together to provide a blank mold cavity and the blank mold is in position over the forehearth in contact with the molten glass, the vacuum valve is actuated and, by atmospheric pressure acting on the glass the blank mold cavity is filled.

Immediately after the gathering operation the cut-off knife 23 is rocked across the bottom of the body blank mold 22 in contact therewith and the string of glass which depends from the lower end of the blank when it is gathered into the blank mold is severed. The connections for the cut-off knife have not been illustrated.

Referring still to Fig. 1 and 2, the machine is provided with a sectional finishing mold 40 corresponding to the usual blow mold employed in Owens suction type machines and which is designed for cooperation with the neck mold 21 in the usual manner after the body blank mold has become opened and has been moved out of cooperation with the neck mold leaving the blank suspended from the latter. In this regard it is to be noted that the inner walls of the neck mold 21 are bulged inwardly, i. e. convex, and that when the blank is left suspended as shown in Fig. 5 the sides of the blank fill out and assume a more or less conical configuration. The purpose of making the walls of the neck mold 21 convex and obtaining this shape differential is two-fold. In the first place the exact amount of glass required to produce the finished insulator is measured in the volume of capacity of the blank mold cavity, and secondly, the glass in the suspended blank is brought to a more desirable shape for expanding as will presently be set forth.

Since the present machine does not employ a blowing operation for shaping the blank but instead utilizes a pressing operation, the finishing mold 40 may well be termed a press mold. This press mold 40 (Fig. 2) is mounted in a hinged frame 41 traveling on a serpentine camway 42 and the sections of the mold are hinged for opening and closing movements on arms 43 pivoted on a common vertical shaft 44, the latter being mounted on the mold shoe 45. Slide operated actuating devices 46 serve to control the opening and closing movements of the press mold sections 40. In order to raise and lower the mold shoe 45 relative to the frame 41 to accommodate press molds of different heights where different sizes of insulators are manufactured, an adjusting shaft 47, acting through a rack and worm pinion 48, is accessible for the purpose.

The arrangement of the finishing mold or press mold 40 just described, except insofar as the shape thereof is concerned and except for the omission of mechanism for blowing the molten blank to final form, is conventional and it has been simply illustrated on the drawings and briefly mentioned herein. Its construction and operation will readily be understood by reference to the various patents heretofore cited.

Referring now to Figs. 2, 3 and 5, a plunger head or casing 50 is suspended from the press mold shoe 45 and is provided with an internal web 51 medially thereof dividing the same into upper and lower chambers 52 and 62 respectively. A plug member 53 having a bore 49 therein is threadedly received in the shoe 45 and extends into the press mold 40 and partially closes the lower end of the press mold cavity. A shaft 54 extends completely through the casing 50 and into the plug member 53 and is provided with a head 55 at the upper end thereof. A pressing mandrel 56 having an exterior configuration conforming to the configuration of the insulator cavity and which accordingly is provided with two series of threads 57 and 58 of like pitch is provided with a shank 59 adapted to be received in the upper end of the head 55 by a driving fit. An elongated sleeve 60 is mounted upon the shaft 54 and the upper end thereof is provided with threads 61 adapted, during the actual pressing operation to be received in an interiorly threaded portion 63 in the bore 49 of the plug member 53. The threads 61 and 63 are of the same pitch as the threads 57 and 58 on the mandrel 56 for a purpose that will be set forth hereinafter. The lower end of the shaft 54 is threaded and a spring 54′ surrounding the sleeve 60 bears at one end against the casting 50 and at the other end against a collar 50′ which is clamped against the sleeve 60 by a nut 64 mounted on the threaded end of the shaft 54.

The shaft 54, mandrel 56 and sleeve 60 as a unit constitute a plunger which is capable of axial shifting movement while at the same time means is provided for imparting rotary movement thereto in opposite directions alternately in such a manner that as the mandrel 56 is elevated during the pressing operation it moves into the molten glass of the blank suspended from the neck mold 21 and in so doing bores its way into the glass, so to speak. During this pressing operation the lower portion of the blank is expanded into contact with the walls of the finishing or press mold cavity. In Fig. 5 the mandrel is shown as it commences to penetrate the molten blank B, whereas in Fig. 3 the mandrel is shown after the pressing operation has been completed and the molten glass blank B has compacted against the walls of the press mold cavity. It is to be noted that because the suspended blank is generally of tapered configuration as previously described, uniform expansion of the blank when the mandrel 56 moves thereinto is effected and the glass meets the walls of the finishing or press mold cavity without entrapping air as would be the case were the walls of the neck mold cavity not curved inwardly and the suspended blank allowed to assume a more baggy shape.

Referring now to Fig. 3, a pair of reversing gears 65 and 66 are rotatably mounted in the casing 50, the former being mounted in the web 51 and the latter in the bottom of the casing 50. The sleeve 60 extends through the gears 65 and 66 and is independently rotatable therein. The sleeve 60 is splined as at 69 and a direction changing gear 70 mounted on the splined portion 69 is shiftable from a neutral position wherein it is out of contact with both gears 65 and 66 to an upper position (shown in Fig. 3) wherein the sleeve 60, shaft 54 and mandrel 56 are rotatable as a unit in one direction as the mandrel enters the blank, or to a lower position (shown in Fig. 5) wherein the sleeve, shaft and mandrel are rotatable in the other direction as the latter is withdrawn from the solidified blank. Shifting of the gear 70 to its upper position causes the gear 70 to engage the upper end of the spline 69 of the sleeve 60 and elevate the latter until such time as the threads 61 engage the threads 63 of the plug member 53 at which time the two gears 65 and 70 come into engagement and rotation and advancement of the sleeve and mandrel commences.

Shifting of the driving gear 70 is effected by means of a grooved collar 71 and form mechanism 72, the latter being mounted on one arm of a bell crank lever 73 which is pivoted as at 74 to the casing 50. The other arm of the lever 73 carries a cam roller 75 the movements of which are controlled by a pair of cam rails 76 and 77 and which is movable from the full line position of Fig. 2 to the dotted line position thereof.

The reversing gears 65 and 66 are continuously and simultaneously driven in opposite directions, at least during such intervals as either of them have operative functions, by means of a gear 80 in the casing 50 which is connected through an enclosed train of gears including gears 81, 82, 83, a flexible coupling 84, and a second train of exposed gears 85, 86, 87. The last gear 87 is in the form of a traction gear adapted to travel on a rack 88 extending at least partially around the machine. The function of the two gear trains 81, 82, 83, and 85, 86, 87, is to increase the speed of rotation of the mandrel 56 in either direction with respect to the relatively slower speed of rotation of the forming machine which under normal conditions of manufacture is in the neighborhood of one revolution per minute.

The operation of the machine is as follows:

The machine being arranged so that in the course of its rotation the blank molds will pass over a pool of molten glass contained in the forehearth F, the neck molds 21 and body blank molds 22 being closed and in the position shown in Fig. 1, the dipping frame 20 is lowered until the bottom of the blank mold touches the surface of the molten glass. At this time vacuum is applied to the blank mold through the passages 32$^c$, 32$^a$ and 32$^d$, 32$^b$ and, by atmospheric pressure on the molten glass, the blank mold is filled and the blank formed. The dipping frame 20 is raised as soon as the blank mold is filled and the cut-off knife 23 is moved across the lower end of the blank mold and is otherwise actuated. Vacuum through the passages 32$^c$, 32$^a$ is discontinued and the sections of the body blank mold 22 are then opened by the mechanism 28 and the suspended blank B which is supported in the neck mold 21 and adapter 30 by vacuum still maintained in the passages 32$^d$, 32$^b$ assumes the shape shown in Fig. 5. At this time the hinged frame 41 is raised on the serpentine cam rail 42 and the finishing or press mold 40 is brought into position and its sections closed by the mechanism 46 about the blank as shown in Fig. 5. The gear 87 (Fig. 4) meeting the rack 88 causes rotation of the mandrel 56 through the gear train 87, 86, 85, flexible coupling 84, and gear train 83, 82, 81, while simultaneously the cam rail 76 maintains the direction changing gear 70 in contact with the gear 65 so that the mandrel 56 is caused to move into the blank B to expand the same, threading its way into the blank as it progresses. After the blank has been expanded into contact with the walls of the press mold 40 as shown in Fig. 3, the cam rail 76 brings the direction changing gear 70 to a neutral position midway between the gears 65 and 66 and out of contact with either gear so that rotation of the mandrel 56 ceases until the glass of the blank B has had time to solidify.

After solidification of the blank B, which occurs somewhat later in the machine cycle, the mechanism 46 causes the finishing mold sections to become opened and shortly thereafter the neck mold sections are likewise opened by the mechanism controlling them.

As the press mold approaches the forehearth F the hinged frame 41 is lowered on the serpentine cam rail 42 to lower the press mold and mandrel assembly with the formed blank attached to and supported on the mandrel 56. As this assembly arrives at the discharge zone of the machine the cam roller 75 is moved inwardly of the forming machine by the cam rail 76 (Fig. 2) and the gear 70 is thereby lowered into engagement with the gear 66 thus unthreading the mandrel from the blank in the manner previously described.

After the mandrel has been withdrawn from the formed blank as shown in Fig. 1, the finished insulator is left loosely supported on the inclined plug member 53 from which it may be removed from the machine by a suitable take-out mechanism.

Modifications may be resorted to within the spirit and scope of the appended claims.

I claim:

1. A glassware forming machine for producing hollow insulators comprising a blank forming mechanism including cooperating neck and body blank molds, means for filling said molds with a charge of glass from a gathering pool by suction to form a blank therein, means for opening the body blank mold to leave the blank suspended from the neck mold, a press mold, means for moving the press mold into alignment with the neck mold, means for closing the press mold about the suspended blank, a mandrel for pressing the blank to final shape against the walls of the press mold cavity, and means for moving said mandrel into the press mold cavity.

2. A glassware forming machine for producing hollow insulators comprising a blank forming mechanism including cooperating neck and body blank molds, means for filling said molds with a charge of glass from a gathering pool by suction to form a blank therein, means for opening the body blank mold to leave the blank suspended from the neck mold, a press mold, means for closing the press mold about the suspended blank, a mandrel for pressing the blank to final shape against the walls of the press mold cavity, said mandrel being movable axially into and out of the cavity, and cam means for moving said mandrel into the press mold cavity.

3. A glassware forming machine for producing hollow interiorly threaded insulators comprising a blank forming mechanism including cooperating neck and body blank molds, means for filling said molds with a charge of molten glass from a gathering pool by suction to form a blank therein, means for opening the body blank mold to leave the blank suspended from the neck mold, a press mold, means for closing the press mold about this suspended blank, a mandrel for pressing the blank to final shape against the walls of the press mold cavity, threads on the mandrel, means for moving said mandrel into the press mold cavity, and for withdrawing the same therefrom, and means for rotating the mandrel during the withdrawal operation in a direction to unthread the mandrel from the blank.

4. A glassware forming machine for producing hollow interiorly threaded insulators comprising a blank forming mechanism including cooperating neck and body blank molds, means for filling said molds with a charge of molten glass from a gathering pool by suction to form a blank therein, means for opening the body blank mold to leave the blank suspended from the neck mold, a press mold, means for closing the press mold about the suspended blank, a mandrel for pressing the blank to final shape against the walls of the press mold cavity, threads on the mandrel for forming the insulator threads, means for moving the mandrel into the press mold cavity and for withdrawing the same therefrom, means for rotating the mandrel in one direction during at least a portion of its movement into the cavity to thread the mandrel into the blank, and means for rotating the mandrel in the other direction during the withdrawal operation to unthread the same from the blank.

5. A glassware forming machine for producing hollow insulators comprising a blank forming mechanism including cooperating neck and body blank molds, means for filling said molds with a charge of glass from a gathering pool by suction to form a blank therein, means for opening the body blank mold to leave a blank suspended from the neck mold, a press mold, means for moving the press mold into axial alignment with the neck mold, means for closing the press mold about the suspended blank, a plunger in alignment with the press mold and slidable into and out of the press mold cavity, means for moving the mandrel, and means for opening the press mold and the neck mold when the mandrel is in the cavity of the former.

6. In a glassware forming machine for producing hollow insulators, a blank forming mechanism including cooperating neck and body blank molds, means for filling said molds with a charge of glass to form a blank therein, means for opening the body blank mold to leave a blank suspended from the neck mold, a press mold, means for moving the press mold into axial alignment with the neck mold, means for closing the press mold about the suspended blank, a plunger in alignment with the press mold and slidable into and out of the press mold cavity, means for moving the mandrel, and means for opening the press mold and the neck mold when the mandrel is in the cavity of the former.

7. In a glassware forming machine for producing hollow interiorly threaded insulators, a blank forming mechanism including cooperating neck and body blank molds, means for filling said molds with a charge of molten glass to produce a blank, means for opening the body blank mold to leave the blank suspended from the neck mold, a press mold, a mold shoe therebeneath, a plug member supported on the shoe having a bore communicating with the press mold cavity, a portion of said bore being threaded, a plunger slidable in the bore and including a mandrel having threads thereon of a pitch equal to the pitch of the threads in said bore, said mandrel being adapted upon sliding of the plunger to be projected into and out of the press mold cavity, a portion of the mandrel having threads thereon designed for engagement with the threads in the bore when the mandrel is projected into and withdrawn from the press mold cavity, means for moving said mandrel axially, and means for rotating the mandrel in opposite directions.

8. In a glassware forming machine for producing hollow interiorly threaded insulators, a blank forming mechanism including cooperating neck and body blank molds, means for filling said molds with a charge of molten glass from a gathering pool by suction to produce a blank, means for opening the body blank mold to leave the blank suspended from the neck mold, a press mold, a mold shoe therebeneath, a plug member supported on the shoe having a bore communicating with the press mold cavity, a portion of said bore being threaded, a plunger slidable in the bore and including a mandrel having threads thereon of a pitch equal to the pitch of the threads in said bore, said mandrel being adapted upon sliding of the plunger to be projected into and out of the press mold cavity, a portion of the mandrel having threads thereon designed for engagement with the threads in the bore when the mandrel is projected into and withdrawn from the press mold cavity, cam means for moving said mandrel axially, and means for rotating the mandrel in opposite directions.

9. In a glassware forming machine for producing hollow threaded insulators, a blank forming mechanism including cooperating neck and body blank molds for forming the neck portion and body portion of a blank respectively and a head mold cooperating with the neck mold for forming the crown portion of the blank, the walls of the body blank mold being curved inwardly, means for filling said molds with a charge of molten glass from a gathering pool by suction to produce a blank, means for opening the body blank mold to leave the blank suspended from the neck mold, the extent of curvature of the walls of the body blank mold being such that the freely suspended body portion of the blank assumes a substantially conical form, a press mold, means for moving the press mold into alignment with the neck mold, means for closing the press mold about the suspended blank, a mandrel for pressing the blank to final shape against the walls of the press mold cavity, and means for moving said mandrel into the press mold cavity.

10. In a glassware forming machine for producing hollow threaded insulators, a blank forming mechanism including cooperating neck and body blank molds, means for filling said molds with a charge of molten glass to form a blank therein, the walls of the body blank mold being curved inwardly whereby the formed blank is provided with an annular restriction therein in the body portion thereof, means for opening the body blank mold to leave the blank suspended from the neck mold whereby the restricted portion of the blank becomes filled in by outward flow of the molten glass of the blank due to gravity, a press mold, means for moving the press mold into alignment with the neck mold, means for closing the press mold about the suspended blank, a mandrel for pressing the blank to final shape against the walls of the press mold cavity, and cam means for moving said mandrel into the mold cavity.

11. Apparatus for forming hollow insulators comprising a pair of vertically spaced frames, means for continuously rotating said frames in unison, blank molds including neck and body blank molds on the upper frame, press molds on the lower frame adapted to register with the blank molds, means for filling the blank molds with charges of molten glass to produce blanks therein, means for opening the body blank molds to leave the blanks suspended from the neck molds, means for closing the press molds about the suspended blanks, a plurality of mandrels for pressing the blanks to final shape against the walls of the press mold cavities, and means for moving the mandrels into the press mold cavities.

12. Apparatus for forming hollow interiorly threaded insulators comprising a pair of vertically spaced frames, means for continuously rotating said frames in unison, blank molds including neck and body blank molds on the upper frame, press molds on the lower frame adapted to register with the blank molds, means for filling the blank molds with charges of molten glass from a gathering pool by suction to produce blanks therein, means for opening the body blank molds to leave the blanks suspended from the neck molds, means for closing the press molds about the suspended blanks, a plurality of mandrels having threads formed thereon for pressing the blanks to final shape against the walls of the press mold cavities, means for moving the mandrels into and out of the press mold cavities, and means for rotating the mandrels during movement thereof.

LEONARD D. SOUBIER.